United States Patent [19]  
Franklin et al.

[11] Patent Number: 4,554,259  
[45] Date of Patent: Nov. 19, 1985

[54] LOW EXPANSION, ALKALI-FREE BOROSILICATE GLASS SUITABLE FOR PHOTOMASK APPLICATIONS

[75] Inventors: Brian Franklin, Kingston, Pa.; Karl-Heinz Mader, Delligsen, Fed. Rep. of Germany

[73] Assignee: Schott Glass Technologies, Inc., Duryea, Pa.

[21] Appl. No.: 608,304

[22] Filed: May 8, 1984

[51] Int. Cl.$^4$ .............................................. C03C 3/08
[52] U.S. Cl. .................................... 501/67; 428/428; 430/5; 430/296; 501/61; 501/62; 501/64; 501/903
[58] Field of Search ............ 501/903, 67, 64, 61, 501/62; 430/5

[56] References Cited

U.S. PATENT DOCUMENTS

| | | | |
|---|---|---|---|
| 3,723,354 | 3/1973 | Wada et al. | 501/64 |
| 3,728,646 | 4/1973 | Zijustra | 501/61 |
| 3,794,502 | 2/1974 | LaGrouw | 501/64 |
| 4,319,215 | 3/1982 | Yamazaki et al. | 501/67 |
| 4,321,317 | 3/1982 | MacIver | 430/5 |
| 4,391,916 | 7/1983 | Nakagawa et al. | 501/62 |
| 4,411,972 | 10/1983 | Narken et al. | 430/5 |
| 4,421,593 | 12/1983 | Curtis et al. | 430/5 |
| 4,476,216 | 10/1984 | Tobias | 430/296 |
| 4,501,819 | 2/1985 | Yatsuda et al. | 501/61 |

OTHER PUBLICATIONS

Izumitani, T. et al., "Surface Texture Problems of High Precision Glass Substrates for Photomasks", Hoya Optics, Menlo Park, Calif. (1976).

Primary Examiner—Helen M. McCarthy  
Attorney, Agent, or Firm—Millen & White

[57] ABSTRACT

Alkali-free borosilicate glass have been developed having coefficients of thermal expansion (+20° C. to +200° C.) below $40.5 \times 10^{-7}$, densities less than 3.0 g/cm$^3$ and good visible and UV transmission, and can be produced by conventional continuous melting techniques. These glasses are particularly suitable for photomask, photovoltaic and mirror substrate applications. Their compositions comprise, in weight percent:

| | |
|---|---|
| $SiO_2$ | 50–60% |
| $B_2O_3$ | 1–6% |
| $Al_2O_3$ | 12–15% |
| MgO | 0–2.5% |
| CaO | 0–5.1% |
| BaO | 9–10% |
| ZnO | 12–18% |
| $CeO_2$ | 0–5% |
| $As_2O_3$ + $Sb_2O_3$ | 0–1.5% |
| PbO | 0–1% |

Sum MgO+CaO+BaO+ZnO=21–33.5.

17 Claims, No Drawings

LOW EXPANSION, ALKALI-FREE BOROSILICATE GLASS SUITABLE FOR PHOTOMASK APPLICATIONS

BACKGROUND OF THE INVENTION

In the manufacture of semiconductor devices, circuit patterns are printed on a substrate wafer (Si, or GaAs) by the following generalized process. A silicon wafer is oxidized to form a thin $SiO_2$ surface layer. The oxidized surface is then covered by a photoresist material which polymerizes on exposure to UV radiation or electron beams. After applying the photoresist, the wafer is aligned with a photomask bearing a negative of the circuit pattern to be printed and exposed to UV light or an electron beam. Areas where the radiation passes through the photomask are polymerized, and areas where radiation is blocked by the photomask are not polymerized. Unpolymerized photoresist is stripped away. The exposed $SiO_2$ surface is then removed, exposing the underlying silicon which can then be doped with various impurities to fabricate the semiconductor device itself. Finally, the overlying polymerized photoresist is itself stripped away. Thus, the function of the photomask is to define the circuit pattern on the substrate. Production of complex, integrated circuits involves as many as 12 or more sequences of the above photolighographic process.

Three basic types of photomasks are used in the semicoductor industry. They have evolved with the increasing complexity of integrated circuits. The first type may be termed "high-expansion" and generally utilizes soda-lime (window glass) and white crown glass types having coefficients of thermal expansion $\leq 100 \times 10^{-7} °C.^{-1}$. Circuit designs are printed on the mask using film emulsions or by a combination iron-chromium coating. Because of the high expansion coefficient, the photomasks are used in contact with the substrate to minimize distortion effects. This contact leads to erosion of the circuit pattern, and the photomasks can only be used for a limited number of exposures, making their use undesirably expensive. Another difficulty with high-expansion photomasks is that the alkali content of the glass reacts chemically with emulsions so as to limit the attainable resolution. Alkali deposited at the photomask surface due to reactions with atmospheric moisture can also lead to pinholes which affect circuit quality and delamination effects which limit the utility of the photomask itself. Consequently, high-expansion photomasks are primarily used to manufacture devices with large circuit geometries (5–10 μm) which are not characteristic of present state-of-the-art integrated circuitry.

The second category is that of low-expansion photomasks. These are usually borosilicate and aluminosilicate glasses having coefficients of thermal expansion $\leq 50 \times 10^{-7} °C.^{-1}$. These lower thermal expansion materials permit noncontact exposure of wafers and thus longer mask lifetime and more critical circuit resoution (2–5 μm). Again, alkali content of these glasss is a critical problem because of its influence in the formation of pinhole defects in the photomask. The connection between alkali content and pinhole defects in photomasks has been discussed by Izumitani et al, "Surface Texture Problems of High Precision Glass Substrates for Photomasks", Hoya Optics, Menlo Park, CA.

The third category of photomasks comprises ultra-low-expansion materials, typically fused silica, with coefficients of thermal expansion below $1 \times 10^{-7} °C.^{-1}$. The very low expansion coefficient is useful as it induces minimal distortion in the applied circuit pattern and thus allows higher resolution. Since fused silica is alkali-free, no alkali-related pitting or other defects occur during photomask fabrication. Unfortunately, fused silica cannot be made in conventional melting units used for multicomponent glasses, is more expensive to produce, and is often of inferior optical quality to what is possible in the low-expansion class of materials. At the present time, integrated circuit production primarily utilizes the first two classes of materials; high-expansion photomasks for low density circuity, and low-expansion materials for more critical applications.

Tables 1 and 2 give a summary of composition and properties of the most widely used low-expansion photomask glasses (LE-30, E-6, CGW7740, and PMG-1).

TABLE 1

Properties of Existing Commercial Photomask Materials
Comparative Summary - Photomask Substrates

| Manufacturer Designation | PMG-1 | Schott Duran 50 | Hoya LE-30 | OHARA E-6 | CGW 7740 |
|---|---|---|---|---|---|
| $n_d$ | 1.5574 | 1.473 | 1.532 | 1.467 | 1.474 |
| $V_d$ | 58.4 | | 65 | | |
| Density (g/cm³) | 2.87 | 2.23 | 2.58 | 2.18 | 2.23 |
| Tg (°C.) | 641 | 530 | 690 | 540 | 530 |
| $\alpha_{20-100}$ (× $10^{-7} °C.^{-1}$) | 42.4 | | 34 | | |
| $\alpha_{100-300}$ (× $10^{-7} °C.^{-1}$) | | | 38 | 25 | |
| $\alpha_{20-300}$ (× $10^{-7} °C.^{-1}$) | 46 | 32.5 | 37 | | 32.5 |
| $T_{10}^{7.6}$ (°C.) | 808 | 815 | 921 | | 821 |
| Hydrolytic Stability (DIN 12111) | | | | | |
| Class | 1 | 1 | | | |
| wt. loss (mg/dm²) | | | 26* | | |
| Acid Stability (DIN 12116) | | | | | |
| Class | >>4 | 1 | | | |
| Wt. loss (mg/cm²) | 1366 | | 77* | | |
| Alkaline stability (DIN 52322) | | | | | |
| Class | 3 | 2 | | | |
| Wt. loss (mg/dm²) | 244 | | 321* | | |
| % $T_{350}$ nm (5 mm) | 71% | | 78.5% | 84% | 85% |
| Knoop Hardness | 539 | | 657 | 520 | 418 |
| Young's Modulus (Gpa) | 74.4 | 63 | 74 | 57.5 | 62.8 |
| Poisson's ratio | ? | .20 | .159 | .195 | .20 |
| Stress optical coeff. ($10^{-6}$ mm²/N) | 3.45 | | 2.86 | | |

TABLE 1-continued

Properties of Existing Commercial Photomask Materials
Comparative Summary - Photomask Substrates

| Manufacturer Designation | Schott PMG-1 | Schott Duran 50 | Hoya LE-30 | OHARA E-6 | CGW 7740 |
|---|---|---|---|---|---|
| Specific Heat (J/g · K) | ? | .84 | | .17 | .17 |
| Thermal Conductivity (W/m · K) | ? | 1.16 | ? | 0.96 | 1.26 |
| $Log_{10}$ Vd. resistivity | | | | | 15 |
| Dielectric Constant | | 4.7 | | 4.0 | 5.1 |

*$H_2O$ = 99° C./1 hr., Acid, .1 $NHNO_3$, 99° C./1 hr., Alkali = .1% NaOH, 50 atm (270° C.)/5 hr. (J1588211)
$^a$50–100° C.

TABLE 2

Composition of Prior-Art Commercial Photomask Glasses

| Manufacturer Designation Wt. % | Schott PMG-1 | Schott Duran 50 | Hoya LE-30 | OHARA E-6 | CGW 7740 |
|---|---|---|---|---|---|
| $SiO_2$ | 46.01 | 80.5 | 59.28 | 79.42 | 80.5 |
| $B_2O_3$ | 11.31 | 12.8 | 4.26 | 15.77 | 13.0 |
| $Al_2O_3$ | 11.03 | 2.3 | 15.41 | 1.08 | 2.3 |
| $Na_2O$ | 0.163 | 3.6 | 1.29 | 2.59 | 4.0 |
| $K_2O$ | 0.31 | 0.6 | 0.80 | <0.02 | |
| MgO | | | 9.21 | | |
| CaO | 4.98 | | 1.33 | <1 | |
| BaO | 13.82 | | 0.96 | <1 | |
| ZnO | 12.04 | | 5.95 | <1 | |
| PbO | | | 0.92 | | |
| $Sb_2O_3$ | | | 0.43 | | |
| $As_2O_3$ | 0.36 | | | 0.9 | |

As can be seen, all of these glasses have thermal expansion coefficients between 30 and $50 \times 10^{-7}$. All also contain alkali, which as mentioned above, is undesirable in view of its deleterious effects on production yields and performance of the final photomask.

SUMMARY OF THE INVENTION

Accordingly, it is an object of this invention to provide alkali-free, low thermal expansion coefficient optical glass useful as a photomask substrate whereby the disadvantages mentioned above are minimized or eliminated.

It is another object of this invention to provide such a glass which can also be used as a transmitting optical material, e.g., as a lens window, or other element of a simple or compound optical device or devices.

It is yet another object of this invention to provide such a glass which can be used to fabricate mirrors or any other such device which does not directly utilize light transmission through the element.

It is still another object of the present invention provide an alkali-free, low-expansion glass suitable for use as a photomask material and also having other physical and optical properties equivalent to or better than existing low-expansion materials, thereby avoiding alkali-associated defects in the manufacture and use of the photomask.

Upon further study of the specification and appended claims, further objects and advantages of this invention will become apparent to those skilled in the art.

These objects have been obtained by the present invention by providing an optical quality glass which has a refractive index $n_d$ of at least 1.50, perferably 1.54–1.57, an Abbe number Vd of at least 55, preferably 56–59, a density of not more than 3.0, preferably 2.80–2.91, and a coefficient of thermal expansion (20°–300° C.) (CTE) of not more than $40.5 \times 10^{-7}$°C.$^{-1}$, preferably $35.5–39.0 \times 10^{-7}$°C.$^{-1}$, which does not contain alkali and which contains at least 90 mol. % of $SiO_2$, $B_2O_3$, $Al_2O_3$, MgO, CaO, BaO and ZnO and consists essentially of in weight percent:

| | General | Preferred |
|---|---|---|
| $SiO_2$ | 50–60 | 50–56 |
| $B_2O_3$ | 1–6 | 2–3.7 |
| $Al_2O_3$ | 12–15 | 12–15 |
| MgO | 0–2.5 | 1.5–2.5 |
| CaO | 0–5.1 | 2–3 |
| BaO | 9–10 | 9–10 |
| ZnO | 12–18 | 14–18 |
| $CeO_2$ | 0–5 | 0–5 |
| $As_2O_3$ + $Sb_2O_3$ | 0–1.5 | 0–1.5 |
| PbO | 0–1 | 0–1 |

Sum MgO+CaO+BaO+ZnO=21–33.5, preferably 23–33.5%,

In mole percent, the composition of this invention consists essentially of:

| | General | Preferred |
|---|---|---|
| $SiO_2$ | 58–66.5 | 58–65 |
| $B_2O_3$ | 2–5 | 2–3.8 |
| $Al_2O_3$ | 8–11 | 8–11 |
| MgO | 0–4 | 2.8–4 |
| CaO | 0–6.5 | 2.5–3.5 |
| BaO | 3–5 | 3–5 |
| ZnO | 10–16 | 10–16 |
| $CeO_2$ | 0–2.5 | 0–2.5 |
| $As_2O_3$ + $Sb_2O_3$ | 0–0.5 | 0–0.5 |
| PbO | 0–0.5 | 0–0.5 |

Sum MgO+CaO+BaO+ZnO=13–31.5, preferably 15–31.5, most preferably 23–26.5, typically about 26 molar percent.

DETAILED DISCUSSION

The low expansion glass composition of this invention, especially suitable for use as a photomask glass, is unlike any other prior art glass. The limits (in terms of weight percent or the essentially equivalent mole percentages) are critical for each of the ingredients of the glass, especially of those for barium oxide and zinc oxide.

If an amount of silicon dioxide higher than that specified above is employed, the resultant glass viscosity will be unsatisfactorily high; if the amount of this component is lower than that specified above, the CTE will be too high. Content of $B_2O_3$ greater than specified will result in phase separation of the glass; a content lower than specified will produce a glass viscosity which is too high. Amounts of Al$_2$O$_3$ higher than specified will cause the glass to become unstable and crystallization will be observed; an amount lower than specified will produce a CTE which is too high.

Magnesium oxide is not a necessary component in the glass composition of this invention; however, it is preferred that this component be present. Amounts of magnesium oxide higher than the specified range will be immiscible in the composition, will cause the glass to become unstable and crystallization will be observed. The same is true for the optional calcium oxide ingredient with respect to its specified range.

Barium oxide is one of the most critical ingredients in the glass composition of this invention, e.g., the coefficient of thermal expansion will change to a larger extent upon variations in its content than for the other components of the glass. Amounts of barium oxide less than the specified range will cause phase separation in the glass; amounts higher than specified will cause the CTE to be too high. It is generally preferred that the amount of barium oxide be about 9.15–9.35 weight percent (about 4.24–4.26 mole percent).

Similarly very critical to the achievement of the desired properties for the glass composition of this invention is the zinc oxide content. Amounts lower than specified will cause the CTE to be too high; amounts higher than specified will be immiscible in the glass composition and will cause the glass to become unstable. In addition, crystallization will be observed. Particularly preferred amounts of zinc oxide are about 14.5–17.1 weight percent (about 12.5–15 mole percent).

Other optional ingredients are cerium oxide, lead oxide and the refining agents antimony oxide and arsenic oxide. Amounts of cerium oxide higher than specified will cause the transmission properties to be too low in the important range of 350–700 nm. Amounts of the refining agents which are too high will cause the glass to refine improperly. Amounts of lead oxide higher than specified will cause the CTE to be too high.

The various end points that define the ranges of the amounts of each ingredient can be varied, within the defined ranges, to establish narrower ranges. That is, each range defined above includes many narrower ranges within it which are part of this invention. For example, a range of 12–18 wt. % is given for ZnO. This range includes the narrower ranges 12.1–18%, 12.0–17.9%, 12.1–17.9%, 12.2–18%, etc., i.e., the narrower included ranges wherein one or both of the endpoints are varied one or more multiples of 0.1%. Thus, the general range 12–18% also includes the narrower ranges 12.5–18%, 12.0–17.5%, 12.5–17.5%, etc, as well as the mentioned preferred ranges such as 14.5–17.1% for ZnO or even narrower ranges such as 14.6–15.1%. The latter is about the smallest practical differential that can be maintained with normal manufacturing procedures. The ranges of other ingredients similarly define corresponding narrower ranges.

The glass of this invention can be prepared using fully conventional techniques normally employed for glasses of this type. For example, the usual raw materials corresponding to the oxides required in the glasses of this invention, e.g., oxides per se, carbonates, nitrates, hydroxides, etc., are blended into a melt in amounts corresponding to the amounts desired in the final glass. Typical melting temperatures are 1200°–1600° C. Conventional crucibles or tanks, e.g., graphite coated, ceramic or platinum containers can be used. The homogeneous melt is then further treated conventionally, e.g., refined, casted into molds, gradually cooled, etc.

A particularly preferred use for the low-expansion glass of this invention, as mentioned, is in photomasking applications as described above. The glass of this invention will be useful in a wide variety of other uses, for example, without intending to limit the scope of the uses of the glass of this invention, to applications including substrates for photovoltaic devices, windows, lenses, mirrors, etc., or other optical components requiring its unique properties, e.g., those having high thermal shock resistance, for general purposes where high quality mirrors with minimized thermal distortion effects are needed, etc. The glass of this invention can be cast, molded or otherwise formed into any desired shape or configuration for any of the many uses to which it is applicable.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following exampes, all temperatures are set forth uncorrected in degrees Celsius; unless otherwise indicated, all parts and percentages are by weight.

EXAMPLES A–F

The following describes a preparation of the glass designated below as the preferred composition A. Corresponding procedures were used to prepare the other glass compositions summarized in Table 3.

Glass Preparation

The following batch materials were weighed and mixed thoroughly.

|  | Amount (kg) |
|---|---|
| Silicon dioxide | .723 |
| Boric Acid | .073 |
| Aluminum hydrate | .249 |
| Magnesium carbonate | .057 |
| Calcium carbonate | .059 |
| Barium nitrate | .209 |
| Red lead | .007 |
| Antimony trioxide | .006 |

The mixed batch is then melted in a 0.5 liter capacity platinum crucible heated by induction at 1530° C. Following melting, the glass is homogenized and refined at 1580° C. for 5 hours. The glass is then cast into graphite-coated steel molds and annealed using an annealing temperature of about 700° C. and a cooling rate of 30° C./hr. The strain-free, annealed glass can then be ground and polished to prepare optical components using conventional techniques.

Table 3 summarizes several examples of glasses of this invention as well as their properties. Examples A, B and C are preferred.

TABLE 3

| Wt. % | Preferred A* | Preferred B* | Preferred C* | D | E | F |
|---|---|---|---|---|---|---|
| $SiO_2$ | 55.28 | 55.56 | 50.51 | 50.56 | 55.17 | 56.49 |
| $B_2O_3$ | 3.16 | 3.18 | 3.68 | 3.18 | 3.16 | 2.17 |
| $Al_2O_3$ | 12.39 | 12.45 | 14.48 | 12.45 | 12.36 | 14.54 |
| MgO | 1.82 | 1.83 | 2.12 | 1.83 | 0 | 1.81 |
| CaO | 2.53 | 2.54 | 2.50 | 2.54 | 5.04 | 2.52 |
| BaO | 9.26 | 9.31 | 9.18 | 9.31 | 9.25 | 9.25 |
| ZnO | 14.60 | 14.67 | 17.08 | 14.67 | 14.57 | 12.27 |
| $CeO_2$ | 0 | 0 | 0 | 5.00 | 0 | 0 |
| PbO | 0.50 | 0 | 0 | 0 | 0 | 0.50 |
| $As_2O_3 + Sb_2O_3$ | 0.46 | 0.46 | 0.45 | 0.46 | 0.45 | 0.46 |
| nd | 1.5514 | 1.548 | 1.5626 | 1.5694 | 1.5531 | 1.5472 |
| Vd | 57.68 | 58.5 | 57.16 | 56.35 | 58.06 | 58.52 |
| density (g/cm³) | 2.84 | 2.83 | 2.91 | 2.98 | 2.84 | 2.80 |
| $CTE_{20-100°}$ ($\times 10^{-7}$°C.$^{-1}$) | 31.4 | 31.6 | 32.1 | 35.1 | 34.5 | 31.5 |
| $CTE_{20-300°}$ ($\times 10^{-7}$°C.$^{-1}$) | 36.4 | 36.3 | 38.5 | 40.3 | 39.2 | 35.7 |
| $CTE_{100-300°}$ ($\times 10^{-7}$°C.$^{-1}$) | 38.2 | 38.2 | 39.4 | 42.3 | 41.3 | 37.4 |
| Tg (°C.) | 676 | 679 | 678 | 674 | 675 | 699 |
| $TiO^{7.6}$ (°C.) | | | 898 | | | |
| Hydrolytic stability (DIN 12111) class/wt. loss (mg/dm²) | 1/12 | 1/12 | N.A. | N.A. | 1/11 | 1/11 |
| Acid stability (DIN 12116) class/wt. loss (mg/dm²) | 3/9.5 | 3/9.5 | N.A. | N.A. | 3/8.3 | 3/6.1 |
| Alkaline stability (DIN 52322) class/wt. loss (mg/dm²) | 2/153 | 2/153 | N.A. | N.A. | 2/152 | 2/141 |
| UV transmission λ 50% T (5 mm) | 314 nm | 316 nm | N.A. | N.A. | 315 nm | 317 nm |
| % T @ 350 nm (5 mm) | 83% | 82% | N.A. | N.A. | 82% | 81% |
| Young's Modulus E ($\times 10^3 N/mm^2$) | 83 | 83 | N.A. | N.A. | 82 | 84 |
| ν, Poisson's ratio | .245 | .245 | N.A. | N.A. | .246 | .241 |
| Thermal conductivity (W/mK) | | | 1.08 | N.A. | 1.06 | 1.10 |

TABLE 4

Mole Percent Values Corresponding to Weight Percent Values of Table 3

| | A | B | C | D | E | F |
|---|---|---|---|---|---|---|
| $SiO_2$ | 64.74 | 64.86 | 59.87 | 61.35 | 64.86 | 66.24 |
| $B_2O_3$ | 3.19 | 3.20 | 3.77 | 3.33 | 3.20 | 2.19 |
| $Al_2O_3$ | 8.54 | 8.56 | 10.11 | 8.90 | 8.56 | 10.04 |
| MgO | 3.17 | 3.18 | 3.75 | 3.31 | — | 3.17 |
| CaO | 3.16 | 3.17 | 3.17 | 3.30 | 6.35 | 3.16 |
| BaO | 4.24 | 4.26 | 4.26 | 4.43 | 4.26 | 4.25 |
| ZnO | 12.63 | 12.65 | 14.95 | 13.14 | 12.65 | 10.63 |
| PbO | .2 | — | — | — | — | .20 |
| $As_2O_3 + Sb_2O_3$ | .11 | .11 | .11 | .12 | .11 | .11 |
| $CeO_2$ | — | — | — | 2.12 | — | — |

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An alkali-free glass having a refractive index of at least 1.50, an Abbe number of at least 55, a density of not more than 3.0, and a thermal expansion coefficient of not more than $40.5 \times 10^{-7}$/°C. over 20°–300° C., and consisting essentially of, in weight percent:

| | |
|---|---|
| $SiO_2$ | 50–60% |
| $B_2O_3$ | 1–6% |
| $Al_2O_3$ | 12–15% |
| MgO | 0–2.5% |
| CaO | 0–5.1% |
| BaO | 9–10% |
| ZnO | 12–18% |
| $CeO_2$ | 0–5% |
| $As_2O_3 + Sb_2O_3$ | 0–1.5% |
| PbO | 0–1% |

Sum $MgO \times CaO \times BaO \times ZnO = 21-33.5$.

2. An alkali-free glass having a refractive index of least 1.50, an Abbe number of at least 55, a density of not more than 3.0, and a thermal expansion coefficient of not more than $40.5 \times 10^{-7}$/°C. over 20°–300° C, and consisting essentially of, in mole percent:

| | |
|---|---|
| $SiO_2$ | 58–66.5 |
| $B_2O_3$ | 2–5 |
| $Al_2O_3$ | 8–11 |
| MgO | 0–4 |
| CaO | 0–6.5 |
| BaO | 3–5 |
| ZnO | 10–16 |
| $CeO_2$ | 0–2.5 |
| $As_2O_3 + Sb_2O_3$ | 0–0.5 |
| PbO | 0–0.5 |

Sum $MgO + CaO + BaO + ZnO = 13-31.5$.

3. A glass of claim 1 having the following properties:

| | |
|---|---|
| refractive index | 1.54–1.57 |
| Abbe number | 56–59 |
| density (g/cm³) | 2.8–2.9 |
| $CTE_{20-300°}$ ($\times 10^{-7}$°C.$^{-1}$) | 35.5–39.0. |

4. A glass of claim 1 consisting essentially of, in weight percent:

| | |
|---|---|
| SiO₂ | 50–56% |
| B₂O₃ | 2–3.7% |
| Al₂O₃ | 12–15% |
| MgO | 1.5–2.5% |
| CaO | 2–3% |
| BaO | 9–10% |
| ZnO | 14–18% |
| CeO₂ | 0–5% |
| As₂O₃ + Sb₂O₃ | 0–1.5% |
| PbO | 0–1% |

Sum MgO+CaO+BaO+ZnO=26.5–33.5.

5. A glass of claim 2 having the following properties:

| | |
|---|---|
| refractive index | 1.54–1.57 |
| Abbe number | 56–59 |
| density (g/cm³) | 2.8–2.9 |
| CTE$_{20-300°}$ (× $10^{-7}$°C.$^{-1}$) | 35.5–39.0. |

6. A glass of claim 2 consisting essentially of, in mole percent:

| | |
|---|---|
| SiO₂ | 58–65 |
| B₂O₃ | 2–3.8 |
| Al₂O₃ | 8–11 |
| MgO | 2.8–4 |
| CaO | 2.5–3.5 |
| BaO | 3–5 |
| ZnO | 10–16 |
| CeO₂ | 0–2.5 |
| As₂O₃ + Sb₂O₃ | 0–0.5 |
| PbO | 0–0.5. |

Sum MgO+CaO+BaO+ZnO=23–26.5.

7. A glass of claim 1 consisting essentially of the following approximate amounts in weight percent:

| | |
|---|---|
| SiO₂ | 55.3% |
| B₂O₃ | 3.2% |
| Al₂O₃ | 12.4% |
| MgO | 1.8% |
| CaO | 2.5% |
| BaO | 9.3% |
| ZnO | 14.6% |
| As₂O₃ + Sb₂O₃ | 0.5% |
| PbO | 0.5% |

8. A glass of claim 1 consisting essentially of the following approximate amounts in weight percent:

| | |
|---|---|
| SiO₂ | 55.6% |
| B₂O₃ | 3.2% |
| Al₂O₃ | 12.5% |
| MgO | 1.8% |
| CaO | 2.5% |
| BaO | 9.3% |
| ZnO | 14.7% |
| As₂O₃ + Sb₂O₃ | 0.5% |

9. A glass of claim 1 consisting essentially of the following approximate amounts in weight percent:

| | |
|---|---|
| SiO₂ | 50.5% |
| B₂O₃ | 3.7% |
| Al₂O₃ | 14.5% |
| MgO | 2.1% |
| CaO | 2.5% |
| BaO | 9.2% |
| ZnO | 17.1% |
| As₂O₃ + Sb₂O₃ | 0.5% |

10. A glass of claim 1 consisting essentially of the following approximate amounts in weight percent:

| | |
|---|---|
| SiO₂ | 50.6% |
| B₂O₃ | 3.2% |
| Al₂O₃ | 12.5% |
| MgO | 1.8% |
| CaO | 2.5% |
| BaO | 9.3% |
| ZnO | 14.7% |
| CeO₂ | 5.0% |
| As₂O₃ + Sb₂O₃ | 0.5% |

11. A glass of claim 1 consisting essentially of, in weight percent:

| | |
|---|---|
| SiO₂ | 50.5–55.6 |
| B₂O₃ | 3.2–3.7 |
| Al₂O₃ | 12.4–14.5 |
| MgO | 1.8–2.1 |
| CaO | 2.5–2.55 |
| BaO | 9.2–9.3 |
| ZnO | 14.6–17.1 |
| As₂O₃ + Sb₂O₃ | 0.4–0.45 |
| PbO | 0–0.5. |

12. In a glass photomask, the improvement wherein the compsoition of the glass is that of claim 1.

13. In a transmissive glass optical element, the improvement wherein the composition of the glass is that of claim 12.

14. An optical element of claim 13 which is a simple of compound lens or a window.

15. In an optical element comprising a coated glass substrate, the improvement wherein the composition of the glass substrate is that of claim 1.

16. In a method of photofabrication comprising irradiating a substrate coated with a photoresist using actinic radiation wherein the radiation is focused onto the substrate through a photomask whereby a desired radiation patter impinges on the substrate, the improvement wherein the photomask consists essentially of a glass composition of claim 1.

17. In a method of conducting light along a desired optical path comprising at least one transmissive or refractive glass optical element or at least one reflective glass optical element, the improvement wherein at least one of said optical elements comprises a glass of a composition of claim 1.

* * * * *